(12) United States Patent
Kubota et al.

(10) Patent No.: US 8,765,273 B1
(45) Date of Patent: Jul. 1, 2014

(54) TUNED HEATSINK LAYERS

(71) Applicant: Seagate Technology LLC, Cupertino, CA (US)

(72) Inventors: Yukiko Kubota, Campbell, CA (US); Xiaobin Zhu, San Ramon, CA (US); Kai-Chieh Chang, Pleasanton, CA (US); Yingguo Peng, San Ramon, CA (US); Yinfeng Ding, Fremont, CA (US); Timothy John Klemmer, Fremont, CA (US); Jan-Ulrich Thiele, Sunnyvale, CA (US); Ganping Ju, Pleasanton, CA (US); Qihong Wu, Dublin, CA (US); Hassib Amini, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/654,120

(22) Filed: Oct. 17, 2012

Related U.S. Application Data

(63) Continuation of application No. 13/590,969, filed on Aug. 21, 2012, now abandoned.

(51) Int. Cl.
 *G11B 5/66* (2006.01)
(52) U.S. Cl.
 USPC .................................. 428/831.2; 360/59

(58) Field of Classification Search
 USPC .......................... 428/665, 671, 673, 674, 663
 See application file for complete search history.

(56) References Cited

U.S. PATENT DOCUMENTS

| | | | |
|---|---|---|---|
| 7,862,914 B2 | 1/2011 | Kubota et al. | |
| 2004/0247945 A1 | 12/2004 | Chen et al. | |
| 2005/0031905 A1* | 2/2005 | Yasui et al. | 428/693 |
| 2005/0135010 A1 | 6/2005 | Liu et al. | |
| 2007/0026263 A1* | 2/2007 | Kubota et al. | 428/832 |
| 2008/0248327 A1* | 10/2008 | Huang et al. | 428/651 |
| 2010/0008042 A1 | 1/2010 | Xu | |
| 2010/0246045 A1 | 9/2010 | Shibata et al. | |
| 2011/0205862 A1 | 8/2011 | Kanbe et al. | |
| 2012/0207003 A1* | 8/2012 | Kanbe et al. | 369/13.33 |
| 2012/0251842 A1* | 10/2012 | Yuan et al. | 428/800 |
| 2013/0016591 A1* | 1/2013 | Tomikawa et al. | 369/13.02 |
| 2013/0260176 A1* | 10/2013 | Dadvand et al. | 428/670 |

\* cited by examiner

*Primary Examiner* — Holly Rickman
(74) *Attorney, Agent, or Firm* — Hall Estill Attorneys at Law

(57) ABSTRACT

A data media may generally be configured in accordance with various embodiments with contactingly adjacent first and second heatsink layers that are tuned with a common crystallographic orientation and with different thermal conductivities to provide a predetermined thermal gradient. The data media may further be configured with a recording layer formed with the common crystallographic orientation adjacent the first and second heatsink layers.

20 Claims, 4 Drawing Sheets

TUNED HEATSINK LAYERS

RELATED APPLICATION

This application is a continuation of copending U.S. patent application Ser. No. 13/590,969 filed on Aug. 21, 2012.

SUMMARY

Various embodiments of the present disclosure are generally directed to a magnetic storage media with tuned heat characteristics during data access operations.

In accordance with various embodiments, first and second heatsink contactingly adjacent layers can be tuned with a common crystallographic orientation and with different thermal conductivities to provide a predetermined thermal gradient.

DETAILED DESCRIPTION

Figure 1:
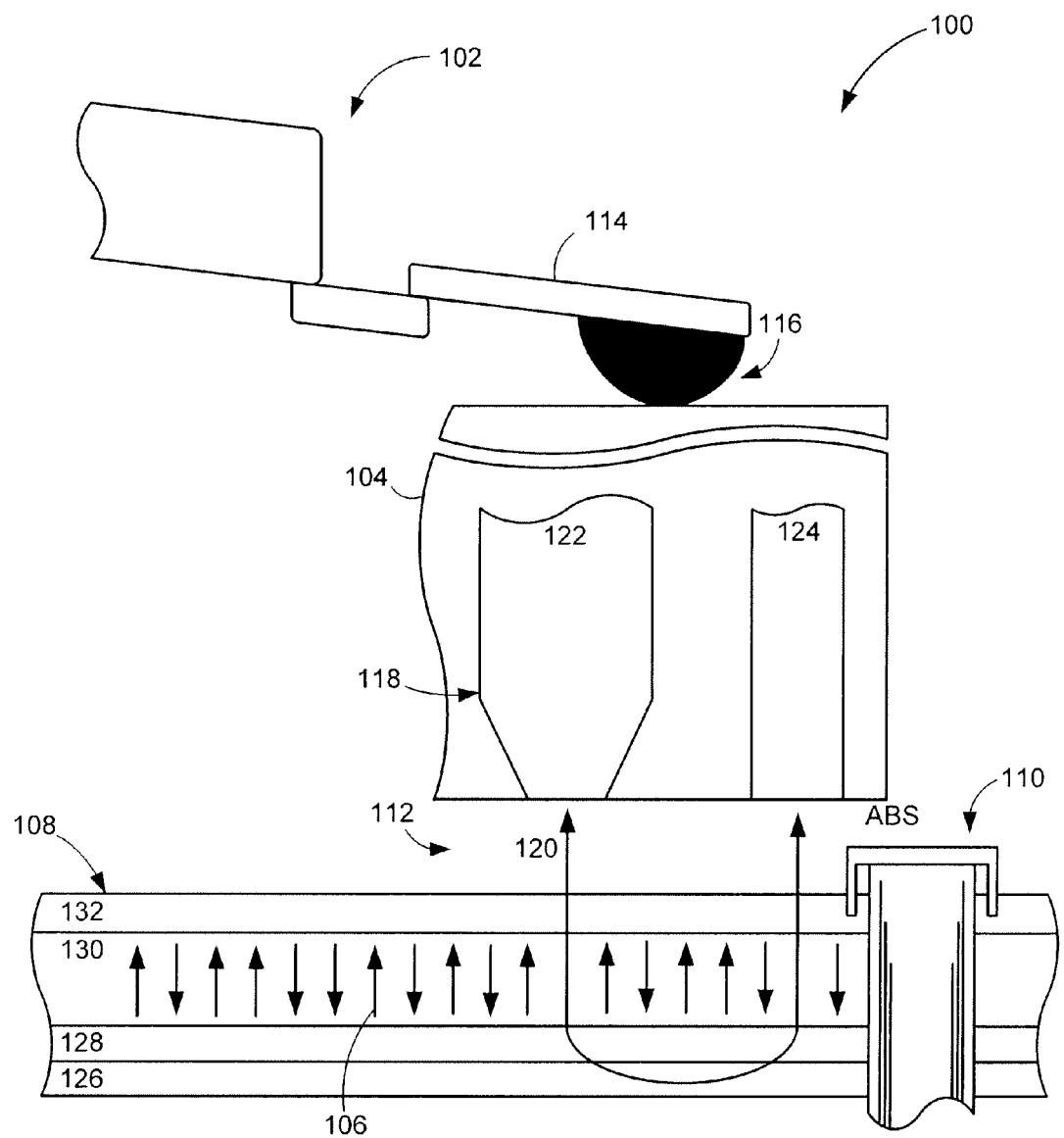
FIG. 1 is a block representation of an example portion of a data storage device constructed and operated in accordance with various embodiments.

As industry advances data storage devices with higher data capacity and data transfer rates, emphasis is placed on the size and integrity of data bits in a data storage media. Advancements in the use of heat to temporarily modify data bit magnetic coercivity have increased data transfer rates, but have also stressed the ability of data media to be quickly heated, such as by a laser in heat assisted magnetic recording (HAMR), without losing data bit programming and reading accuracy. Data media laminations employed in heated applications may be designed and constructed with a heatsink having high thermal conductivity, such as K>150 K/m, that allows heat to engage a particular area of a data media and be quickly dissipated so not to inadvertently effect adjacent data bits.

However, the use of high thermal conductivity heatsink materials, such as Al, Co, Ag, Au, and their alloys, can produce a dominant noise source for the data recording system, especially in increased linear density, reduced form factor data storage devices. Such dominant noise source may be characterized as "media jitter" that can be expressed by the following equation 1:

$$\sigma_j^2 = \frac{1}{N}\left[\left(\frac{\Delta H_{SW}}{\frac{dH}{dx}}\right)^2 + \frac{D^2}{12}\right] = \frac{1}{N}\left[\left(\frac{\Delta H_K(\tau_{write})}{\left(\frac{dT}{dx}\right)*\left(\frac{dH_K}{dT}\right)} + \frac{\delta T_C}{\frac{dT}{dx}}\right)^2 + \frac{D^2}{12}\right] \quad \text{Eq. 1}$$

where $$\frac{dT}{dx}$$

is the thermal gradient, which corresponds to a larger thermal gradient resulting in smaller media jitter.

Although a large thermal gradient may be obtainable by introducing a thermal barrier layer in a data media lamination with bulk materials such as SiO2, MgO, and soft magnetic under-layer (SUL), such a thermal barrier can correspond to higher minimum laser power needed to access a data bit, which may adversely affect data access reliability. Moreover, the use of thermal barrier materials can disrupt the crystallographic orientation of subsequently deposited layers of a data media lamination, such as the magnetic recording layer. As such, a data media lamination with increased thermal gradient and reduced minimum heating power for data access is a continued goal for the industry.

Accordingly, a data media may be configured as a magnetic stack with contactingly adjacent first and second, or multiple laminated, heatsink layers that can each be tuned at least for thickness and material to provide a predetermined crystallographic orientation corresponding to a tuned thermal gradient through the magnetic stack. The ability to tune the thermal gradient of the magnetic stack, and consequently the data media, allows the predetermined crystallographic orientation to be present above the heatsink layers due at least in part to the reduction in thickness or elimination of a thermal resistor layer. That is, each lamination in the layered heatsink can be tuned to provide a thermal gradient that minimizes or eliminates the use of a thermal barrier layer, which allows the data media to be deposited with a crystallographic orientation corresponding to a recording layer that is adapted to different data access operations involving the application of heat.

FIG. 1 generally illustrates a block representation of a data access portion 100 of an example data storage device capable of being tuned to a predetermined thermal gradient. While the data access portion 100 is shown in an environment in which various embodiments of the present technology can be practiced, it should be understood, however, that the various embodiments of this disclosure are not so limited by such environment and can be implemented in a variety of data storage devices, such as solid state data storage applications.

The data access portion 100 has an actuating assembly 102 that positions a transducing head 104 over data bits 106 programmed on a magnetic data media 108. The data media 108 is attached to a spindle 110 that can facilitate rotation of the data media 108 to produce an air bearing surface (ABS) 112 on which a slider portion 114 of the actuating assembly 102 flies to position a head gimbal assembly (HGA) 116, which includes at least the transducing head 104, over various predetermined portions of the media 108.

While not limiting, the transducing head 104 may include one or more transducing elements, such as a magnetic writer and magnetically responsive reader, which operate to program to and read data from the storage media 108, respectively. In this way, controlled motion of the actuating assembly 102 can correspond with positioning the transducers in close proximity to the data media 108 and in alignment with data tracks (not shown) to write, read, and rewrite data, as generally displayed by the data writing portion 118 of the transducing head 104 producing a magnetic pathway 120 flowing from the write pole 122 through the media 108 to the return pole 124, or vice versa.

Regardless of the configuration of the write and return poles 122 and 124, the data writing portion 118 and data media 108 can be respectively constructed and tuned so that the magnetic pathway 120 engages a plurality of layers of the data media 108 immediately after the application of heat. The number, type, and configuration of the various layers of the data media 108 are not limited to a particular design, but the example embodiment of FIG. 1 illustrates a soft magnetic underlayer 126, interlayer structure 128, magnetic recording layer 130, and overcoat 132 successively formed atop one another. Such layer configuration can allow for perpendicular recording of data bits as the magnetic pathway 120 completes a circuit from the write pole 122, across the ABS, and perpendicularly through the recording layer 130, as shown, or longitudinally.

In applications where heat is used to temporarily change the coercivity of the one or more of the data media 108 layers, the use of a thermal resistor in the interlayer structure 128 provides a large thermal gradient conducive to magnetic recording, but at the cost of disrupting the crystallographic orientation of the subsequently deposited recording layer 130. Consequently, data media that can be constructed with large thermal gradients and compatible crystallographic orientation throughout the layers may produce increased data capacity and data transfer rates. In other words, the ability to tune the data media 108 specifically for thermal gradient and crystallographic orientation corresponding to the application of heat can allow data bits to be smaller and more tightly packed in the recording layer 130 without concern for data access difficulties, such as noise associated with media jitter.

Figure 2:
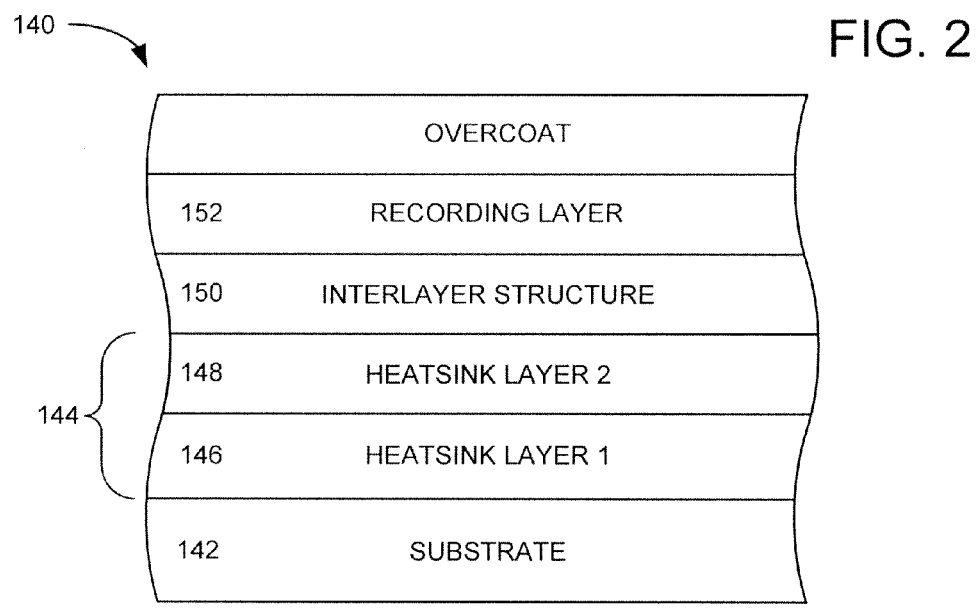
FIG. 2 generally illustrates an example block representation of an example magnetic writing element capable of being used in the data storage device of FIG. 1.

As an example of a data storage lamination capable of providing tuned thermal gradient and crystallographic orientations, FIG. 2 shows a cross-sectional block representation of a portion of an example data media 140 constructed in accordance with various embodiments. The data media 140 can be configured with any number and type of materials deposited in a variety of non-limiting manners, such as sputtering and vapor deposition. In the embodiment shown, a substrate 142 provides a foundation for a heatsink lamination 144 comprising first and second heatsink layers 146 and 148 to be positioned between the substrate 142 and an interlayer structure 150.

The use of at least two heatsink layers 146 and 148 with complementary crystallographic orientations, such as fcc-fcc and bcc-bcc lattice structures with close lattice constant combinations, that form a single phase solid solution allows the interlayer structure 150 and subsequently deposited recording layer 152 to maintain the crystallographic orientation that provides a large thermal gradient throughout the data media 140. Adjustment of the thickness and materials of the various heatsink layers 146 and 148 can tune the heatsink lamination 144 and data media 140 to a variety of thermal gradients conducive to different data access operations involving heat, such as varying laser power HAMR applications.

Here after, explanation is provided for a two layer structure (HS1 & HS2) embodiment, which is a simplified example that can be tuned and optimized with the addition, or removal, of more lamination layer to produce a predetermined thermal gradient profile. While no single heatsink lamination 144 configuration is required or limiting, various embodiments obtain large thermal gradients through the data media 140 by forming the first heatsink layer 146 with a thermal conductivity of approximately 150-400 W/m and the second heatsink layer 148 with a thermal conductivity of approximately 1-100 W/m. Such heatsink lamination 144 configuration can correspond to matching the materials of the heatsink layers 146 and 148 to provide the same lattice structures and single phase solid solution.

By no mean exhaustive, the first heatsink layer 146 may be constructed of a material such as Cu, Ag, W, Mo, and their respective alloys while the second heatsink layer 148 may be deposited with a matching compound with a rich solid solution composition range. That is, formation of a pure Cu first heatsink layer 146 can correspond with a CuNi, CuAl, and CuZn second heatsink layer 148 just as construction of a pure W first heatsink layer 146 can correspond with a WV, WMo, WRe, Wta, and WNb second heatsink layer 148. Similarly, the use of pure Ag for heatsink layer 148 can correspond to AgAl or AgZn construction of heatsink layer 146 that is in an Ag rich solid solution composition range.

The wide variety of materials that can be used for the first and second heatsink layers 146 and 148 to provide matched lattice structures and single phase solid solutions illustrate how the thermal gradient of the data media 140 can be tuned by selection of a predetermined crystallographic orientation in the heatsink lamination 144. The predetermined crystallographic orientation can further reduce or eliminate thermal resistance due to lattice mismatch, which prevents localized epitaxial growth between the heatsink layers 146 and 148 and allows the recording layer 152 to be grown with the predetermined crystallographic orientation.

In contrast, inclusion of a thermal resistor in the data media 140 to provide a large thermal gradient may disrupt the crystallographic orientation of a heatsink structure and inhibit increases in data transfer rates and density, especially in HAMR-type data access systems. Hence, the tuned heatsink lamination 144 of FIG. 2 illustrates how material selection can be used to produce a large thermal gradient while reducing or eliminating crystallographic interference by a thermal resistor.

Figure 3:
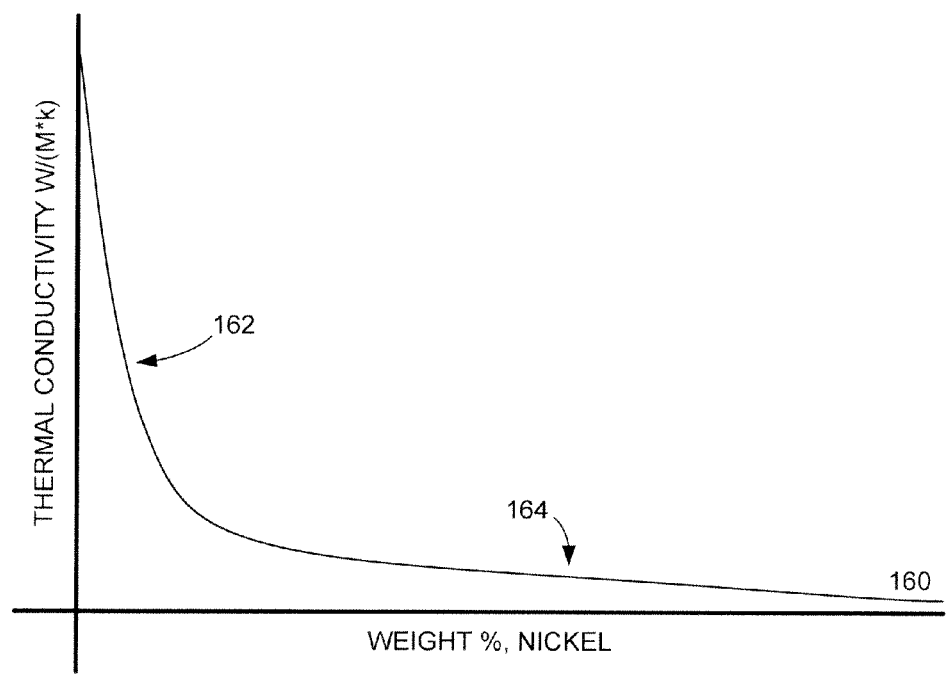
FIG. 3 graphs data generally associated with construction of an example data storage media in accordance with various embodiments.

FIG. 3 graphs data generally associated with construction of a heatsink layer, such as heatsink layers 146 and 148 of FIG. 2, tuned to provide a predetermined thermal gradient. Solid line 160 plots the thermal conductivity of a Cu—Ni alloy as a function of nickel content. The steeply 162 and gradually decreasing 164 portions of the solid line 160 show how material composition of alloys used in a first heatsink layer can further provide tuning knobs capable of precisely providing a thermal conductivity that complements a second heatsink layer to produce a large thermal gradient.

In a non-limiting embodiment, the data of solid line 160 is used to construct a first heatsink layer with roughly a 200 W/m thermal conductivity and a 99.5% Cu alloy composition and a matched second heatsink layer with roughly a 40 W/m thermal conductivity corresponding to approximately a 12% nickel, by weight, Ni—Cu alloy. It can be appreciated that the wide range of thermal conductivities possible with Ni—Cu, and other, alloys can be used to finely tune the material composition of the heatsink layers to provide a graded heatsink lamination producing large thermal gradients.

The ability to tune the material composition of the heatsink layers to provide a heatsink lamination with graded thermal conductivities provides a wide variety of heatsink lamination configurations that can accommodate different heat intensive data access operations. However, material composition is not the only manner of tuning the heatsink lamination as heatsink layer thickness can be adjusted to complement the different thermal conductivities and provide a large thermal gradient without inhibiting crystallographic orientation.

Figure 4:
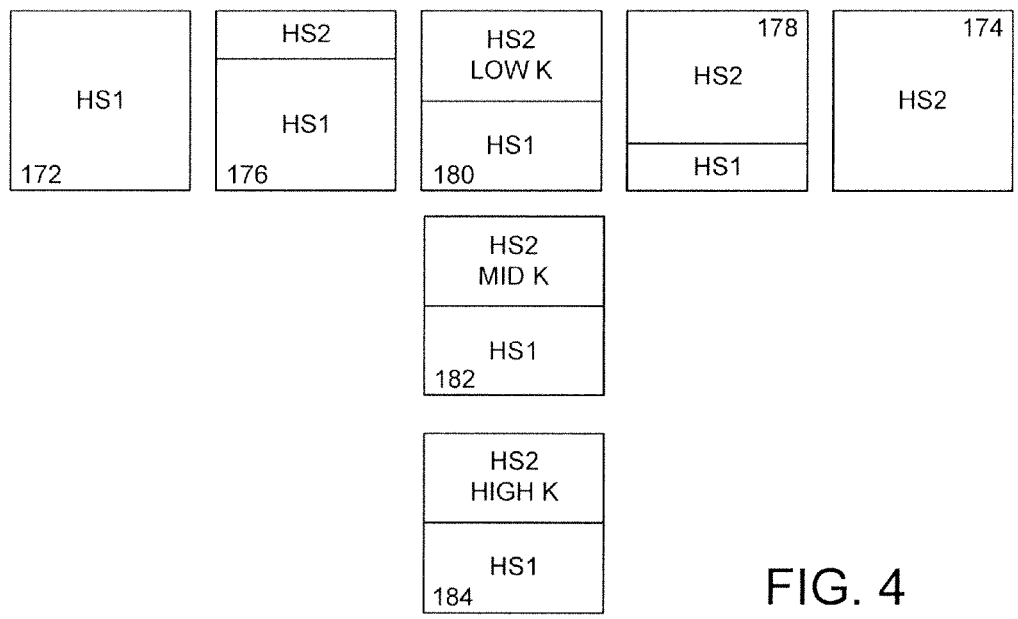
FIG. 4 displays block representations of example portions of a data storage media constructed in accordance with various embodiments.

FIG. 4 shows block representations of several example heatsink laminations differently tuned to provide varying thermal gradients in accordance with various embodiments. The heatsink laminations 172 and 174 are formed with a single heatsink layer and each display contrasting heatsink configurations that may be tuned to provide a predetermined thermal gradient. Heatsink laminations 176, 178, and 180 respectively display varying thickness ratios involving first and second heatsink layers (HS1 & HS2), which can accentuate the thermal conductivity of one heatsink layer over another to increase or decrease the overall thermal gradient.

With the heatsink lamination 180, the thickness ratio is further tuned by setting the second heatsink layer to a relatively low thermal conductivity, such as less than 10 W/m. The heatsink laminations 182 and 184 respectively display how the same thickness ratio can be adjusted by altering the thermal conductivity of the second heatsink layer to a mid-range, such as approximately 50 W/m, and a high-range, like roughly 100 W/m. It is to be understood that the various heatsink laminations 172-184 of FIG. 4 illustrate the ability to tune a heatsink lamination for material composition, thickness ratio, and thermal conductivity to provide a variety of thermal gradients and accommodate the application of wide varieties of heat intensity and duration.

Figure 5:
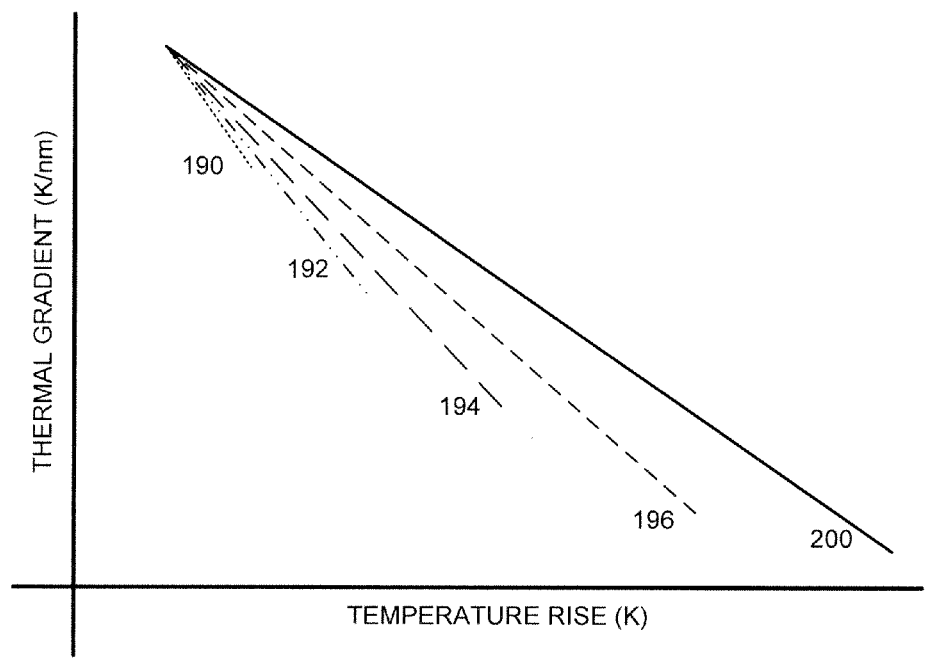
FIG. 5 plots data generally associated with example data storage media.

FIG. 5 plots thermal gradient and temperature rise for increasing constituent heatsink layer thicknesses generally associated with data media tuned to various heatsink lamination configurations, such as the configurations 172-184 provided in FIG. 4. As a baseline, a first segmented line 190 corresponds a single heatsink layer, like heatsinks 172 and 174 of FIG. 4, that exhibits small temperature increase and thermal gradient margin, which could detrimentally effect fast data bit access operations in high data density environments. Second 192, third 194, and fourth 196 segmented lines display progressively increasing temperature and thermal gradient margins obtainable by tuning the thermal conductivity of a second heatsink layer to 40, 20, and 10 W/m, respectively, for various thicknesses.

Solid line 200 provides the largest range of thermal gradients and temperature increases for various heatsink layer thicknesses. The solid line 200 is configured with a 5 W/m second heatsink layer material composition that can be further tuned for thermal gradient and temperature increase by adjusting the thickness ratio of the heatsink lamination, as shown. The data of lines 190-200 provide a minimal subset of operational data that can be used to match the thermal conductivity and thickness ratio of a heatsink lamination to produce a predetermined thermal gradient and heat retention for a data media. The combination of tuned material composition and thickness ratio can also be tuned to produce thermal gradients conducive to operation in HAMR-type environments where the thermal and magnetic field gradients are different, which can stress the speed at which data can be programmed to a data media.

Figure 6:
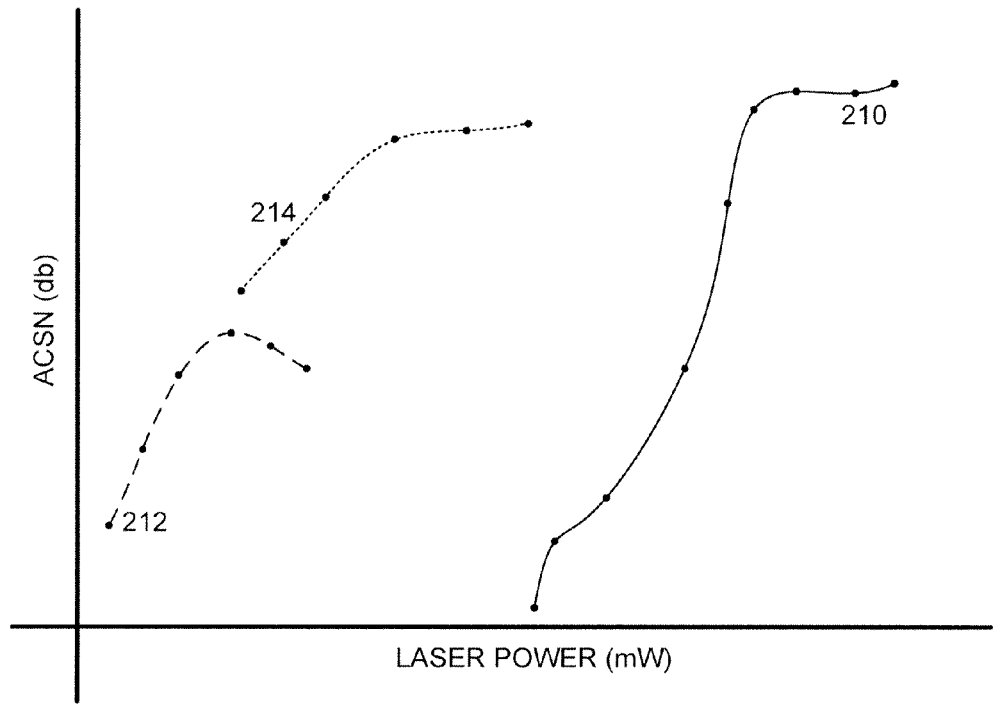
FIG. 6 graphs operational characteristics of a data storage media constructed in accordance with various embodiments.

FIG. 6 graphs signal-to-noise ratio (ASCN) as a function of laser power for an example data media configured with different heatsink laminations in accordance with various embodiments. Forming a heatsink as a single layer, as shown by solid line 210, displays how relatively large laser power is needed for data bit access. Such laser power measurements are not enviable for data media due at least in part to the precise timing of data access operations in HAMR-type applications, which emphasizes the ability to maintain power in a laser.

Segmented lines 212 and 214 respectively plot data for heatsink laminations configured with tuned thermal conductivities and thickness ratios. As shown, the ability to tune the material composition and thickness of heatsink layers can accommodate large and small laser power requirements to provide a range of signal to noise ratios. The lines 212 and 214 further illustrate how tuned heatsink laminations can achieve nearly any ASCN-to-laser power combination up to a threshold, such as 16 db. Such diverse operational coverage allows a heatsink lamination to be tuned to precisely match the data transducing components to provide predetermined heat behavior that allows for increased data density and transfer rates.

Figure 7:
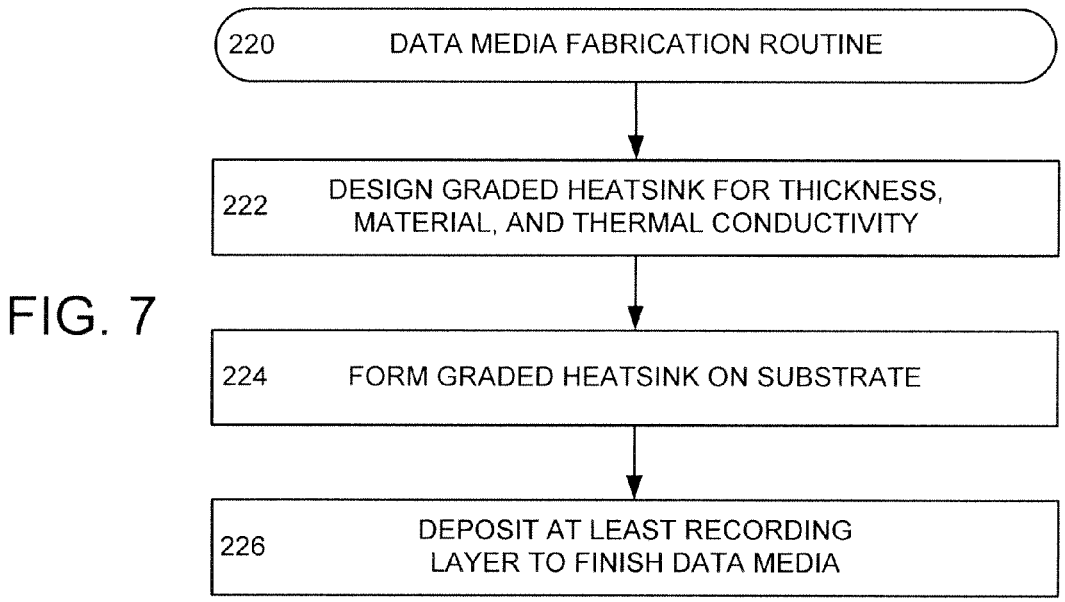
FIG. 7 provides a flowchart of a data media fabrication routine conducted in accordance with various embodiments.

FIG. 7 illustrates an example data media fabrication routine 220 performed in accordance with various embodiments. While not required or limited to a particular means for constructing a data media, the routine 220 can begin in some embodiments by designing a graded heatsink lamination in step 222 that exhibits predetermined crystallographic orientation and thermal gradient. As discussed above, design of a graded heatsink lamination can tune the material composition and thickness of a second heatsink layer to produce a thermal conductivity that complements the material composition, thickness, and thermal conductivity of a first heatsink layer to provide a predetermined thermal gradient. The design considerations of step 222 can encompass a range of variables for the respective heatsink layers, but must be configured to have matching lattice structures and form a single phase solid solution.

With the heatsink lamination designed for crystallographic orientation and thermal gradient, step 224 deposits the heatsink layers. The formation of the heatsink layers is not restricted to a particular manner or underlying structure. That is, the heatsink layers can be deposited with manners like oblique deposition sputtering and physical vapor deposition on an underlying substrate, seed, and adhesion layer that may promote heatsink material growth. Step 226 next constructs at least the magnetic recording layer atop the heatsink layers to finish the fabrication of the data media. Formation of the recording layer and any other protective layers, such as an overcoat, are similarly open a variety of deposition manners and underlying structures as was the construction of the heatsink layers.

As an example, step 226 may deposit a thin thermal resistor layer atop the heatsink layers and subsequently form a seed, magnetic recording, and overcoat layer on the thermal resistor. The use of intervening seed layer and thermal resistor may provide additional thermal gradient tuning without inhibiting the crystallographic orientation provided by the heatsink layers due to their thin thickness relative to the heatsink and magnetic recording layers.

Through the various decisions and steps of routine 220, a data media can be fabricated with precisely tuned structural properties that provide predetermined operational heat characteristics. Such tuning can allow for the use of heat for data access operations without inhibiting the ability to increase data storage capacity and data transfer rates. However, routine 220 is not limited to that shown in FIG. 7 as the various steps can be omitted, changed, and added. For example, evaluation and design of a second heatsink layer can be conducted after the deposition of the first heatsink layer to allow for precise matching of actually formed material composition and thickness.

It can be appreciated that the tuned material and operational characteristics of a magnetic data media described in the present disclosure allows for broad applicability to accommodate a variety of different heat-centric data access systems. The ability to tune the first and second heatsink layers for thermal conductivity allows for reduced heater power to access data with increased signal-to-noise ratio.

Moreover, the matching of lattice structures in a single phase solid solution between the heatsink layers provides a thermal gradient that reduces or eliminates the use of thermal resistor material that disrupts crystallographic orientation continuity between the heatsink layers and a subsequently formed recording layer.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A stack comprising a magnetic recording layer and contactingly adjacent first and second heatsink layers tuned with a common lattice structure and with different thermal conductivities to provide a predetermined thermal gradient, the first and second heatsink layers each comprising a selected material comprising Ag, an Ag alloy, Cu, a Cu alloy, W, a W alloy, Mo, or an Mo alloy.

2. The stack of claim 1, wherein the thermal conductivity of the first heatsink layer is approximately 150-400 W/m.

3. The stack of claim 1, wherein the thermal conductivity of the second heatsink layer is approximately 1-100 W/m.

4. The stack of claim 1, wherein the second heatsink layer further comprises a second material not present in the first heatsink layer.

5. The stack of claim 1, wherein the first and second heatsink layers are formed as a single phase solid solution.

6. The stack of claim 1, wherein the common lattice structure is an fcc-structure.

7. The stack of claim 1, wherein the second heatsink layer comprises a CuNi alloy.

8. The stack of claim 1, wherein the common lattice structure is a bcc-structure.

9. A data media comprising:
a substrate;
a first heatsink layer supported by the substrate and having a bcc lattice structure and a first thermal conductivity, the first heatsink layer comprising a first material; and
a second heatsink layer contactingly supported by the first heat sink layer and having a bcc lattice structure and a second thermal conductivity less than the first thermal conductivity, the second heatsink layer comprising the first material and a second material not present in the first heatsink layer.

10. The data media of claim 9, wherein a first thickness of the first heatsink layer is less than a second thickness of the second heatsink layer.

11. The data media of claim 9, wherein a first thickness of the first heatsink layer is greater than a second thickness of the second heatsink layer.

12. The data media of claim 9, wherein the first material comprises Ag, an Ag alloy, Cu, a Cu alloy, W, a W alloy, Mo, or an Mo alloy.

13. The data media of claim 9, wherein the first material comprises a CuNi alloy.

14. An apparatus comprising:
contactingly adjacent first and second heatsink layers tuned with a common lattice structure and with different thermal conductivities to provide a predetermined thermal gradient, each of the first and second heatsink layers comprising a common material; and
a recording layer formed with the common lattice structure adjacent the first and second heatsink layers.

15. The apparatus of claim 14, wherein a first thermal conductivity of the first heatsink layer is greater than a second thermal conductivity of the second heatsink layer.

16. The apparatus of claim 14, wherein the recording layer, first heatsink layer, and second heatsink layer each have an fcc lattice structure.

17. The apparatus of claim 14, wherein the recording layer, first heatsink layer, and second heatsink layer each have a bcc lattice structure.

18. The apparatus of claim 14, wherein a thermal resistor layer is disposed between the second heatsink layer and the recording layer.

19. The apparatus of claim 16, wherein the predetermined thermal gradient corresponds to heat assisted magnetic recording (HAMR).

20. The apparatus of claim 14, wherein the common material comprises a CuNi alloy.

* * * * *